(No Model.)
T. J. HITCHCOCK.
HOOK FOR HAY CARRIERS.
No. 408,620. Patented Aug. 6, 1889.
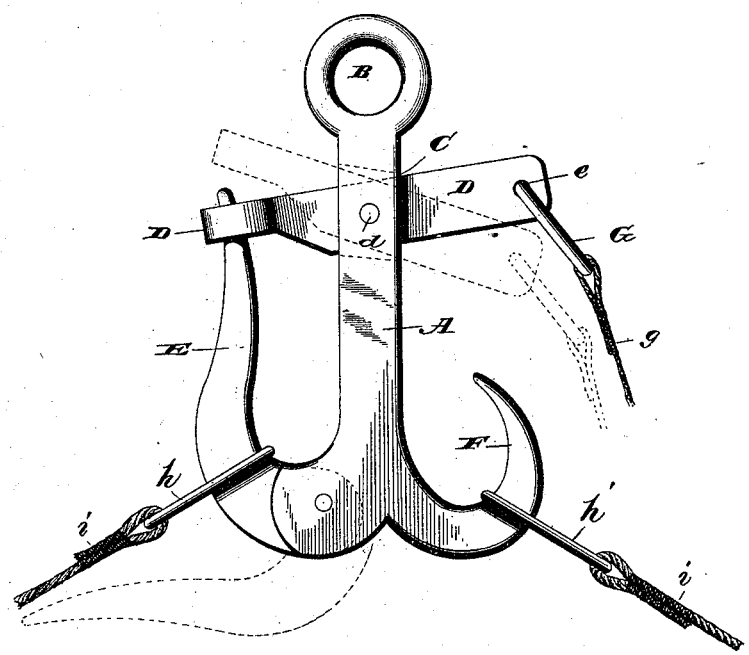
Witnesses
L. S. Elliott
E. W. Johnson
Thomas J. Hitchcock.
Inventor
By his Attorneys

UNITED STATES PATENT OFFICE.

THOMAS J. HITCHCOCK, OF PORTLAND, MICHIGAN.

HOOK FOR HAY-CARRIERS.

SPECIFICATION forming part of Letters Patent No. 408,620, dated August 6, 1889.

Application filed May 2, 1889. Serial No. 309,379. (No model.)

*To all whom it may concern:*

Be it known that I, THOMAS J. HITCHCOCK, a citizen of the United States of America, residing at Portland, in the county of Ionia and State of Michigan, have invented certain new and useful Improvements in Hooks for Hay-Carriers; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

This invention relates to certain new and useful improvements in hooks for hay-carriers.

The object of the invention is to provide a simple, cheap, and effective means for carrying a hay-sling so that one end of the rope forming the sling may be released to dump the load; and it consists in the construction and combination of the parts, as will be hereinafter fully set forth, and particularly pointed out in the claim.

In the accompanying drawing I have illustrated my invention by a side view, in which—

A refers to the shank of the hook, provided at its upper end with an eye B, through which passes a connection for coupling the hook to a traveling carriage or other suitable support. Beneath the eye B the shank is provided with an opening or recess C, the upper and lower walls of which form stops for the bar D, pivoted within said recess by a pin $d$. The downward movement of one end of this pivoted bar is limited by contact with the edges of the recess on opposite sides of the shank, and its upward movement limited by contact with the opposite edges. This bar D is slightly enlarged at one end, as shown at D', and is provided with an eye adapted to pass over the upper end of the member E, pivoted at its lower end to one of the projections of the shank A. On the opposite side of the shank an integral complete rigid hook F is formed, the end of which is turned inwardly toward the shank to better hold the ring thereon. The lower end of the shank opposite the hook F has an integral incomplete hook portion, which is bifurcated and the outer edges thereof curved, against which the curved shoulders formed on the pivoted member E abut, thus providing a smooth joint.

The pivoted bar D is provided with a perforation $e$, through which is passed a ring G, which has attached thereto a cord $g$, for moving the bar D to trip the member E and permit the ring $h$ to be released therefrom when it is desired to dump the load carried by the sling, said sling being connected to the rings $h$ and $h'$ by the ropes $i$ $i$.

The hereinbefore-described hook is simple in construction, cheap, and is not liable to get out of order or be obstructed in its operation by hay or straw settling upon the same when in use.

I am aware that prior to my invention hooks for hay-carriers have been provided which are adapted to release the load by tripping a hook, and I do not claim such construction, broadly; but

What I claim as new, and desire to secure by Letters Patent, is—

In a hook for hay-carriers, the vertical shank A, provided with intermediate horizontal recess C, having inclined walls, an eye B at its upper end, and with oppositely-extending integral complete and incomplete hook portions at its base, an extended member E, having its inner extremity pivotally connected to said incomplete portion, and a latch-bar D, centrally pivoted in said recess and having a vertically-perforated end to engage the upper extremity of said member E to form a closed hook, and perforated at its other end for the attachment of an operating-cord, substantially as set forth.

In testimony whereof I affix my signature in presence of two witnesses.

THOMAS J. HITCHCOCK.

Witnesses:
  GEO. W. PORTER,
  S. K. GATES.